US008984861B2

(12) United States Patent
Sakamoto et al.

(10) Patent No.: US 8,984,861 B2
(45) Date of Patent: Mar. 24, 2015

(54) CATALYST DETERIORATION DIAGNOSIS METHOD, METHOD FOR PURIFICATION OF EXHAUST GAS USING THE DIAGNOSIS METHOD, CATALYST DETERIORATION DIAGNOSIS APPARATUS, AND APPARATUS FOR PURIFICATION OF EXHAUST GAS USING THE DIAGNOSIS APPARATUS

(71) Applicant: Kabushiki Kaisha Toyota Chuo Kenkyusho, Nagakute-shi, Aichi (JP)

(72) Inventors: Yoshiyuki Sakamoto, Toyota (JP); Akihiko Suda, Seto (JP); Akira Morikawa, Nagoya (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 66 days.

(21) Appl. No.: 13/847,722

(22) Filed: Mar. 20, 2013

(65) Prior Publication Data

US 2013/0255228 A1 Oct. 3, 2013

(30) Foreign Application Priority Data

Mar. 27, 2012 (JP) ................. 2012-070749

(51) Int. Cl.
*F01N 3/00* (2006.01)
*F01N 3/10* (2006.01)
(Continued)

(52) U.S. Cl.
CPC ............ *F01N 11/00* (2013.01); *F02D 41/1475* (2013.01); *F01N 2550/02* (2013.01);
(Continued)

(58) Field of Classification Search
CPC . F01N 11/00; F01N 2550/02; F01N 2560/12; F01N 2900/1624; F02D 41/1475; Y02T 10/47

USPC ............. 60/274, 276, 277, 285, 299
See application file for complete search history.

(56) References Cited

U.S. PATENT DOCUMENTS 4,574,264 A * 3/1986 Takahashi et al. ............. 338/34
5,975,758 A 11/1999 Yokota et al.
(Continued)

FOREIGN PATENT DOCUMENTS

CN A-1133821 10/1996
CN A-101146612 3/2008
(Continued)

OTHER PUBLICATIONS

Herrmann, "The electronic factor and related redox processes in oxidation catalysis," *Catalysis Today*, 2006, pp. 73-77, vol. 112, published by Elsevier B.V.
(Continued)

*Primary Examiner* — Audrey K Bradley
(74) *Attorney, Agent, or Firm* — Oliff PLC

(57) ABSTRACT

A catalyst deterioration diagnosis method for diagnosing deterioration of a catalyst for purification of exhaust gas by using a test catalyst disposed in an exhaust gas flow path through which the exhaust gas flows, the method including an exhaust gas control step of inverting an air-fuel ratio of the exhaust gas in the flow path from a lean side to a rich side or from a rich side to a lean side; a measurement step of measuring a change over time in electrical resistance of the test catalyst at the inversion of the air-fuel ratio and finding a resistance change ratio of the test catalyst; and a determination step of determining catalytic deterioration of the test catalyst based on the resistance change ratio.

9 Claims, 7 Drawing Sheets

(51) Int. Cl.
   *F01N 11/00* (2006.01)
   *F02D 41/14* (2006.01)
(52) U.S. Cl.
   CPC ..... *F01N2560/12* (2013.01); *F01N 2900/1624* (2013.01); *Y02T 10/47* (2013.01); *F02D 2200/0814* (2013.01)
   USPC .............. 60/277; 60/274; 60/285; 60/299

(56) References Cited

U.S. PATENT DOCUMENTS

| | | | |
|---|---|---|---|
| 2009/0124491 | A1 | 5/2009 | Miura et al. |
| 2013/0029840 | A1 | 1/2013 | Morikawa et al. |

FOREIGN PATENT DOCUMENTS

| | | | | |
|---|---|---|---|---|
| EP | 0 708 066 A1 | 4/1996 | | |
| JP | A-10-30999 | 2/1998 | | |
| JP | A-2003-117348 | 4/2003 | | |
| JP | A-2007-315979 | 12/2007 | | |
| JP | A-2008-180195 | 8/2008 | | |
| JP | A-2009-84061 | 4/2009 | | |
| JP | A-2009-191787 | 8/2009 | | |
| JP | 2010127091 A | * 6/2010 | ................ | F01N 3/20 |
| JP | A-2012-057545 | 3/2012 | | |
| WO | 2006101216 A1 | 9/2006 | | |

OTHER PUBLICATIONS

Mar. 19, 2014 Japanese Office Action issued in Japanese Application No. 2012-070749 (with partial translation).

Masahiro Sugiura, "Oxygen storage materials for automotive catalysts: ceria-zirconia solid solutions," Catalysis Surveys from Asia, vol. 7, No. 1, Apr. 2003, pp. 77-87.

Oct. 11, 2014 Office Action issued in Chinese Patent Application No. 201180019058.5.

* cited by examiner

US 8,984,861 B2

CATALYST DETERIORATION DIAGNOSIS METHOD, METHOD FOR PURIFICATION OF EXHAUST GAS USING THE DIAGNOSIS METHOD, CATALYST DETERIORATION DIAGNOSIS APPARATUS, AND APPARATUS FOR PURIFICATION OF EXHAUST GAS USING THE DIAGNOSIS APPARATUS

CROSS-REFERENCE TO RELATED APPLICATIONS

This application claims priority to Japanese Patent Application No. 2012-070749 filed on Mar. 27, 2012, the entire contents of which are incorporated by reference herein.

BACKGROUND OF THE INVENTION

1. Field of the Invention

The present invention relates to a method for diagnosing deterioration of a catalyst used for purification of exhaust gas emitted from an internal combustion engine or for other purposes.

2. Related Background Art

Many catalysts for purification of exhaust gas have been developed so far for purification of harmful components emitted from internal combustion engines such as those of automobiles. For example, catalysts in which a noble metal such as platinum (Pt) and/or rhodium (Rh) is supported on a metal oxide support have been widely utilized as the catalysts for purification of exhaust gas. Moreover, catalysts have also been widely known in which a rare-earth metal oxide such as ceria or lanthana having an oxygen storage/release performance is used as the metal oxide in order to further improve the exhaust gas purification performance of the catalysts. Regarding such catalysts, for example, Japanese Unexamined Patent Application Publication No. 2009-84061 describes a catalyst for purification of exhaust gas in which a ceria-zirconia-based composite oxide is used as a catalyst having a crystal phase in which cerium ions and zirconium ions are regularly ordered (hereinafter, referred to as a regularly ordered phase).

As a method for diagnosing deterioration of such a catalyst for purification of exhaust gas, for example, Japanese Unexamined Patent Application Publication No. Hei 10-30999 describes a method for detecting deterioration of a catalyst, wherein a thermal history of a catalyst is detected by using a thermal history detection sensor comprising electrodes, a diffusion layer of a composite oxide having electrically insulating properties or the like, and an electrically conductive metal species such as a noble metal. However, such a thermal history detection sensor detects only aggregation of the noble metal, and cannot detect lowering in the oxygen storage/release performance.

Moreover, as a method for diagnosing deterioration of a catalyst by detecting lowering in the oxygen storage/release performance, for example, Japanese Unexamined Patent Application Publication No. 2009-191787 describes a method (so called the Cmax method) for diagnosing deterioration of a catalyst, wherein the air-fuel ratio of an exhaust gas flowing to a catalyst is forcibly switched to a rich side or a lean side, and an oxygen storage capacity of the catalyst is measured along with the switching, so that the deterioration of the catalyst is diagnosed. However, when such a Cmax method is carried out, it is necessary to dispose air-fuel ratio sensors both upstream and downstream of a flow path of the exhaust gas flowing to the catalyst. Moreover, in the Cmax method, the change in state of the catalyst is indirectly monitored by monitoring the air-fuel ratio in the exhaust gas flow path. Hence, the Cmax method has a problem that when the sensor itself is deteriorated, it is difficult to perform an accurate diagnosis. Note that, regarding such a sensor, for example, Japanese Unexamined Patent Application Publication No. 2007-315979 describes an oxygen sensor element in which $Ce_{0.5}Y_{0.5}O_{2-\delta}$ is used as a temperature compensation material, and $Ce_{0.9}Zr_{0.1}O_2$ is used as an oxide semiconductor, which is a gas detection material. However, this publication fails to describe deterioration of the sensor itself.

In addition, regarding the n-type semiconductor containing ceria, for example, Jean-Marie Herrmann, Catalysis Today, 2006, vol. 112, pp. 73 to 77 states that there is a correlation between an oxidation reaction rate of carbon monoxide using titania as a catalyst and the square of the electron conductivity of the titania. However, this publication is totally silent about the oxygen storage/release performance and the deterioration of the catalyst.

SUMMARY OF THE INVENTION

The present invention has been made in view of the above-described problems of the conventional technologies, and an object of the present invention is to provide a catalyst deterioration diagnosis method which makes it possible to diagnose deterioration of a catalyst based on information directly obtained from a test catalyst in a simple and accurate manner, a method for purification of exhaust gas using the diagnosis method, a catalyst deterioration diagnosis apparatus, and an apparatus for purification of exhaust gas using the diagnosis apparatus.

The present inventors have conducted earnest study to achieve the above object. As a result, the present inventors have found that, in the case of a catalyst having an oxygen storage/release performance, there is a correlation between the oxygen storage/release performance and a resistance change ratio at inversion of an air-fuel ratio of a supplied exhaust gas from a lean side (an oxidizing atmosphere) to a rich side (a reducing atmosphere) or a rich side to a lean side. For example, it has been found that the resistance change ratio of the catalyst at the inversion of the air-fuel ratio from a lean side to a rich side increases with the lowering in oxygen storage/release amount of the catalyst.

Based on these findings, the present inventors have found that the lowering of catalytic activity of a catalyst for purification of exhaust gas due to lowering in oxygen storage/release performance of the catalyst, i.e., deterioration of the catalyst can be diagnosed in a simple and accurate manner by a method for diagnosing deterioration of a catalyst for purification of exhaust gas by using a test catalyst disposed in an exhaust gas flow path through which the exhaust gas flows, wherein an air-fuel ratio of the exhaust gas in the flow path is inverted from a lean side to a rich side or from a rich side to a lean side; a change over time in electrical resistance of the test catalyst is measured at the inversion of the air-fuel ratio, and the resistance change ratio of the test catalyst is found; and deterioration of the test catalyst is determined based on the resistance change ratio. This finding has led to the completion of the present invention.

Specifically, a catalyst deterioration diagnosis method of the present invention is a method for diagnosing deterioration of a catalyst for purification of exhaust gas by using a test catalyst disposed in an exhaust gas flow path through which the exhaust gas flows, the method comprising:

an exhaust gas control step of inverting an air-fuel ratio of the exhaust gas in the flow path from a lean side to a rich side or from a rich side to a lean side;

a measurement step of measuring a change over time in electrical resistance of the test catalyst at the inversion of the air-fuel ratio and finding a resistance change ratio of the test catalyst; and a determination step of determining deterioration of the test catalyst based on the resistance change ratio.

A preferred mode of the catalyst deterioration diagnosis method of the present invention is such that a catalyst deterioration diagnosis apparatus is used which comprises at least one pair of first electrodes which are disposed in the flow path and which face each other, the test catalyst disposed between the first electrodes, resistance value measurement means electrically connected to the test catalyst, and determination means electrically connected to the resistance value measurement means, in the measurement step, the resistance change ratio of the test catalyst is found by causing the resistance value measurement means to measure the change over time in electrical resistance of the test catalyst at the inversion of the air-fuel ratio, and in the determination step, the deterioration of the test catalyst is determined by causing the determination means to compare the resistance change ratio with a first threshold regarding the resistance change ratio set by finding in advance a relationship between an oxygen storage/release performance and the resistance change ratio of the test catalyst.

Another preferred mode of the catalyst deterioration diagnosis method of the present invention is such that a catalyst deterioration diagnosis apparatus is used which comprises at least one pair of first electrodes which are disposed in the flow path and which face each other, the test catalyst disposed between the first electrodes, at least one pair of second electrodes which are disposed in the flow path and which face each other, a reference catalyst which is disposed between the second electrodes and which is subjected to a durability test in advance, resistance value measurement means electrically connected to the test catalyst and the reference catalyst, and determination means electrically connected to the resistance value measurement means, in the measurement step, the resistance change ratio of the test catalyst and a resistance change ratio of the reference catalyst are found by causing the resistance value measurement means to measure the change over time in electrical resistance of the test catalyst and a change over time in electrical resistance of the reference catalyst at the inversion of the air-fuel ratio, and in the determination step, the deterioration of the test catalyst is determined by causing the determination means to compare a ratio between the resistance change ratio of the test catalyst and the resistance change ratio of the reference catalyst with a second threshold regarding the ratio between the resistance change ratios set by finding in advance a relationship between an oxygen storage/release performance and the resistance change ratio of each of the test catalyst and the reference catalyst.

Furthermore, in the catalyst deterioration diagnosis method of the present invention, each of the test catalyst and the catalyst for purification of exhaust gas to be diagnosed is preferably a catalyst comprising a rare-earth metal oxide, and a measurement temperature in the measurement step is preferably 400 to 1200° C. Moreover, in the catalyst deterioration diagnosis method of the present invention, the measurement step is preferably a step of finding the resistance change ratio at inversion of the air-fuel ratio from a lean side to a rich side.

In addition, a method for purification of exhaust gas of the present invention is a method, wherein;

the exhaust gas is brought into contact with the catalyst for purification of exhaust gas to purify the exhaust gas, and deterioration of the catalyst for purification of exhaust gas is diagnosed by using the catalyst deterioration diagnosis method of the present invention.

Moreover, a catalyst deterioration diagnosis apparatus of the present invention is an apparatus for diagnosing deterioration of a catalyst for purification of exhaust gas, comprising:

a test catalyst disposed in an exhaust gas flow path through which the exhaust gas flows;

means for inverting an air-fuel ratio of the exhaust gas in the flow path from a lean side to a rich side or from a rich side to a lean side;

means for measuring a change over time in electrical resistance of the test catalyst at the inversion of the air-fuel ratio and finding a resistance change ratio of the test catalyst; and means for determining deterioration of the test catalyst based on the resistance change ratio.

In addition, an apparatus for purification of exhaust gas of the present invention comprises:

the catalyst for purification of exhaust gas disposed in the exhaust gas flow path through which the exhaust gas flows; and the catalyst deterioration diagnosis apparatus of the present invention for diagnosing deterioration of the catalyst for purification of exhaust gas.

Note that although it is not exactly clear why the catalyst deterioration diagnosis method of the present invention makes it possible to diagnose deterioration of a catalyst based on information directly obtained from a test catalyst in a simple and accurate manner, the present inventors speculate as follows. Specifically, in the case of a catalyst having an oxygen storage/release performance such as a ceria-zirconia-based composite oxide having a regularly ordered phase, when the catalyst is deteriorated by being exposed to a high-temperature condition for a long period and/or repeatedly, the crystal structure changes from a regular structure to a random structure, and the oxygen storage/release performance is lowered. The electrical resistance of a rare-earth metal oxide such as ceria used in such a composite oxide having a regularly ordered phase tends to be lowered upon reduction from an oxidation state. Moreover, the electrical resistance of particles generally varies also depending on the crystal structure of the particles, the state and amount of particle interfaces, the particle diameter, and the like. Hence, the present inventors speculate that, in the case of a catalyst whose release rate of oxygen from the inside of the crystals is reduced because the crystal structure becomes a random structure as mentioned above, for example, when the air-fuel ratio of the exhaust gas is switched from a lean side (an oxidizing atmosphere) to a rich side (a reducing atmosphere) (at reduction), the sharp decrease in electrical resistance is observed at reduction, because only the surface of the catalyst is preferentially reduced.

On the other hand, in a non-deteriorated catalyst having a regular crystal structure, oxygen is sufficiently diffused in the crystal bulk, and the oxygen concentration is kept constant throughout the crystal. Hence, at reduction, the catalyst is reduced uniformly from the inside of the catalyst, and the lowering in electrical resistance of the catalyst due to the reduction is milder than that of the above-described deteriorated one. The present inventors speculate that, for this reason, the lowering in catalytic activity due to lowering in oxygen storage/release performance, i.e., the deterioration of the test catalyst can be determined by measuring the change over time in electrical resistance of the test catalyst at the inversion of the air-fuel ratio of the exhaust gas, and finding the resistance change ratio.

Hence, deterioration of a catalyst for purification of exhaust gas can be diagnosed as follows: a catalyst similar to the catalyst (the catalyst for purification of exhaust gas) disposed in an exhaust gas flow path through which the exhaust gas flows for the purpose of purification of the exhaust gas or the like is used as the test catalyst; the catalyst deterioration diagnosis method of the present invention is carried with the test catalyst being disposed in the same flow path in which the catalyst for purification of exhaust gas is also disposed; and the deterioration of the test catalyst is monitored.

The present invention makes it possible to diagnose deterioration of a catalyst based on information directly obtained from a test catalyst in a simple and accurate manner, a method for purification of exhaust gas using the diagnosis method, a catalyst deterioration diagnosis apparatus, and an apparatus for purification of exhaust gas using the diagnosis apparatus.

DETAILED DESCRIPTION OF THE PREFERRED EMBODIMENTS

Figure 1:
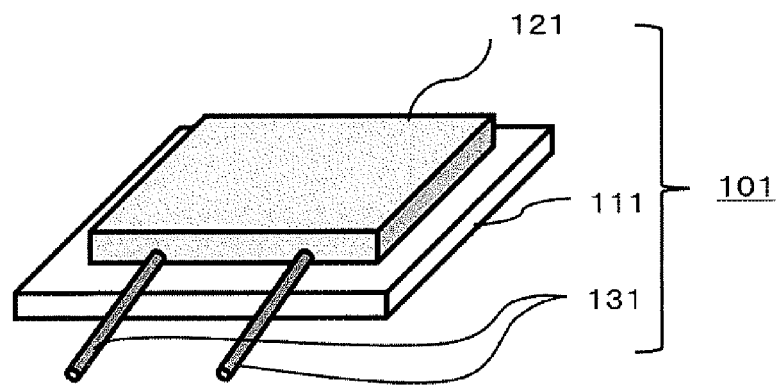
FIG. 1 is a schematic perspective view showing an embodiment of a catalyst deterioration diagnosis element according to a first embodiment of the present invention.

Hereinafter, the present invention will be described in detail based on preferred embodiments thereof.

First, a catalyst deterioration diagnosis method of the present invention will be described. Specifically, the catalyst deterioration diagnosis method of the present invention is a method for diagnosing deterioration of a catalyst for purification of exhaust gas by using a test catalyst disposed in an exhaust gas flow path through which the exhaust gas flows, the method comprising:

an exhaust gas control step of inverting an air-fuel ratio of the exhaust gas in the flow path from a lean side to a rich side or from a rich side to a lean side;

a measurement step of measuring a change over time in electrical resistance of the test catalyst at the inversion of the air-fuel ratio and finding a resistance change ratio of the test catalyst; and a determination step of determining deterioration of the test catalyst based on the resistance change ratio.

Examples of catalysts whose deterioration can be diagnosed by the present invention include catalysts at least part of which has an oxygen storage/release performance. Examples of such catalysts include catalysts comprising a rare-earth metal oxide, and more specific examples thereof include catalysts for purification of exhaust gas in which a noble metal is supported on a porous support made of a rare-earth metal oxide, and the like. Examples of the rare-earth metal oxide include ceria, lanthana, ceria-zirconia composite oxide, ceria-zirconia-yttria composite oxide, ceria-alumina composite oxide, ceria-alumina-zirconia composite oxide, ceria-silica composite oxide, ceria-silica-zirconia composite oxide, and the like. One of these rare-earth metal oxides may be used alone, or two or more thereof may be used in combination.

The support may further comprise a metal oxide such as alumina, silica, or magnesium oxide, in addition to the rare-earth metal oxide. Meanwhile, examples of the noble metal include Pt, Pd, Rh, Ir, Ru, and the like. One of these noble metals may be used alone, or two or more thereof may be used in combination.

In addition, the same catalyst as the catalyst to be diagnosed (the catalyst for purification of exhaust gas) is preferably used as the test catalyst according to the present invention. Moreover, examples of the test catalyst according to the present invention include those having an oxygen storage/release performance and electrical conductivity or electrical semi-conductivity, because the electrical resistance of the test catalyst is directly measured, and the deterioration thereof is determined based on the relationship between the resistance change ratio and the oxygen storage/release performance. Note that, when the catalyst to be diagnosed comprises noble metal on the support, the support may be extracted, and used as the test catalyst. In addition, when the catalyst to be diagnosed comprises an electrically non-conductive oxide such as alumina or silica, and electrical conductivity or electrical semi-conductivity cannot be secured, a major component and/or part having an oxygen storage/release performance and having electrical conductivity or electrical semi-conductivity may be extracted, and used as the test catalyst.

A method for producing such a catalyst is not particularly limited, and a known method can be employed, as appropriate. For example, the catalyst can be obtained by performing an oxidation treatment on a composite oxide precursor obtained by performing a reduction treatment on a powder of a composite oxide of ceria and zirconia at 1500 to 1900° C., in accordance with the method disclosed in Japanese Unexamined Patent Application Publication No. 2009-84061.

Examples of the exhaust gas to be purified by the catalyst in the present invention include mixture gases emitted from factories or internal combustion engines such as engines of vehicles. Examples of components contained in the exhaust gas include NO, $C_3H_6$, CO, $H_2$, $O_2$, $CO_2$, $H_2O$, $N_2$, and the like. In the present invention, the statement that "the air-fuel ratio of the exhaust gas is on a lean side" means that the exhaust gas atmosphere is an oxidizing atmosphere. In such an oxidizing atmosphere, an oxidizing gas concentration in the exhaust gas is preferably 0.1% by volume or higher, and more preferably 0.1 to 20% by volume. If the oxidizing gas concentration is less than the lower limit, the oxidation reaction tends not to proceed, so that the change in electrical resistance tends to be too small to be detected. Examples of the oxidizing gas include oxygen, nitrogen monoxide, and the like. One of these oxidizing gases may be used alone, or two or more thereof may be used in combination. The test catalyst is oxidized by bringing a gas in such an oxidizing atmosphere (hereinafter, referred to as a lean gas in some cases) into contact with the test catalyst. In addition, the temperature of the lean gas is not particularly limited, as long as the catalyst can be sufficiently oxidized at the temperature. For example, the temperature is preferably 400 to 800° C.

In the present invention, the statement that "the air-fuel ratio of the exhaust gas is on a rich side" means that the exhaust gas atmosphere is a reducing atmosphere. In such a reducing atmosphere, a reducing gas concentration in the exhaust gas in terms of hydrogen is preferably 0.01% by volume or higher, and more preferably 0.01 to 10% by volume. If the reducing gas concentration is less than the lower limit, the change in electrical resistance tends to be too small to be detected. Examples of the reducing gas include hydrogen, carbon monoxide, hydrocarbons, and the like. One of these reducing gases may be used alone, or two or more thereof may be used in combination. The test catalyst is reduced by bringing a gas in such a reducing atmosphere (hereinafter, referred to as a rich gas in some cases) in contact with the test catalyst. The temperature of the rich gas is not particularly limited, as long as the catalyst can be sufficiently reduced at the temperature. For example, the temperature is preferably 400 to 800° C.

The flow rate of the exhaust gas is set, as appropriate, according to the amount of the test catalyst and the space capacity of the exhaust gas flow path. For example, the flow rate is generally about 0.1 to 100 L/min in terms of total space velocity of the exhaust gas.

In the present invention, the test catalyst is disposed in an exhaust gas flow path through which the exhaust gas flows, and the air-fuel ratio of the exhaust gas in the flow path is inverted from a lean side to a rich side or from a rich side to a lean side (the exhaust gas control step); a change over time in electrical resistance of the test catalyst is measured at the inversion of the air-fuel ratio, and a resistance change ratio of the test catalyst is found (the measurement step); and deterioration of the test catalyst is determined based on the obtained resistance change ratio (the determination step).

In the exhaust gas control step according to the present invention, the air-fuel ratio is inverted to a rich side when the air-fuel ratio in the exhaust gas flow path is on a lean side, whereas the air-fuel ratio is inverted to a lean side when the air-fuel ratio is on a rich side. A method for such inversion is not particularly limited, and a known method can be used, as appropriate. Examples of the method include a method in which a sensor is disposed upstream and/or downstream of the test catalyst disposed in the exhaust gas flow path, and an internal combustion engine emitting the exhaust gas is controlled based on a signal detected by the sensor, so that the exhaust gas flowing in the exhaust gas flow path is switched from a lean gas to a rich gas or from a rich gas to a lean gas; and a method in which an exhaust gas control valve is provided upstream of the test catalyst, and a composition or a flow rate of the exhaust gas is controlled.

In the measurement step according to the present invention, a method for measuring the change over time in electrical resistance of the test catalyst is not particularly limited, and for example, the change over time in electrical resistance is preferably measured by supporting the test catalyst on an insulating substrate, and disposing the catalyst between a pair of electrodes facing each other. Although the measurement time varies depending on the space capacity of the exhaust gas flow path and a threshold employed in a determination method to be described later, the measurement time is preferably about 10 to 60 seconds stating from the inversion of the air-fuel ratio of the exhaust gas flowing through the exhaust gas flow path, from the viewpoint that the difference between the resistance change ratio of a deteriorated catalyst and the resistance change ratio of a non-deteriorated catalyst is greater, so that the precision of the diagnosis is further improved. Note that, in this case, the resistance change ratio according to the present invention is represented by the following formula:

Resistance Change Ratio=[Electrical Resistance ($\Omega$) at Inversion of Air-Fuel Ratio]/[Electrical Resistance ($\Omega$)$t$ Seconds after Inversion of Air-Fuel Ratio], where t represents the measurement time.

In the measurement step according to the present invention, the measurement temperature is preferably 400 to 1200° C., and more preferably 500 to 700° C., from the viewpoint that the electrical resistance is too large at low-temperatures, whereas the electrical resistance is too small at high-temperatures. In addition, in the present invention, the resistance change ratio may be measured at the inversion of the air-fuel ratio of the exhaust gas flowing through the exhaust gas flow path from a lean side to a rich side (hereinafter, referred to as "at reduction" in some cases), or the resistance change ratio may be measured at the inversion of the air-fuel ratio of the exhaust gas flowing through the exhaust gas flow path from a rich side to a lean side (hereinafter, referred to as "at oxidation" in some cases). It is preferable to measure the resistance change ratio at reduction, from the viewpoint that the difference between the resistance change ratio of a deteriorated catalyst and the resistance change ratio of a non-deteriorated catalyst is greater, so that the precision of the diagnosis is further improved.

In the determination step according to the present invention, the deterioration of the test catalyst is determined based on the resistance change ratio of the test catalyst by making use of the correlation between the resistance change ratio at the inversion of the air-fuel ratio and an oxygen storage/release performance of the test catalyst. A determination criterion varies depending on the apparatus used for the diagnosis, the regulation value of exhaust gas, and the like, and examples thereof include determination criteria shown in a first embodiment and a second embodiment described below.

Hereinafter, a detailed description will be given with reference to the drawings by taking preferred embodiments of the present invention as examples. However, the catalyst deterioration diagnosis method of the present invention is not limited thereto. Note that, in the following description and drawings, the same or equivalent elements are denoted by the same reference sings, and overlapping descriptions are omitted.

First, a first embodiment of the present invention is described as a preferred mode of the present invention. The first embodiment of the present invention is the catalyst deterioration diagnosis method, wherein a catalyst deterioration diagnosis apparatus is used which comprises at least one pair of first electrodes which are disposed in the flow path and which face each other, the test catalyst disposed between the first electrodes, resistance value measurement means electrically connected to the test catalyst, and determination means electrically connected to the resistance value measurement means, in the measurement step, the resistance change ratio of the test catalyst is found by causing the resistance value measurement means to measure the change over time in electrical resistance of the test catalyst at the inversion of the air-fuel ratio, and in the determination step, the deterioration of the test catalyst is determined by causing the determination means to compare the resistance change ratio with a first threshold regarding the resistance change ratio set by finding in advance a relationship between an oxygen storage/release performance and the resistance change ratio of the test catalyst.

Figure 2:
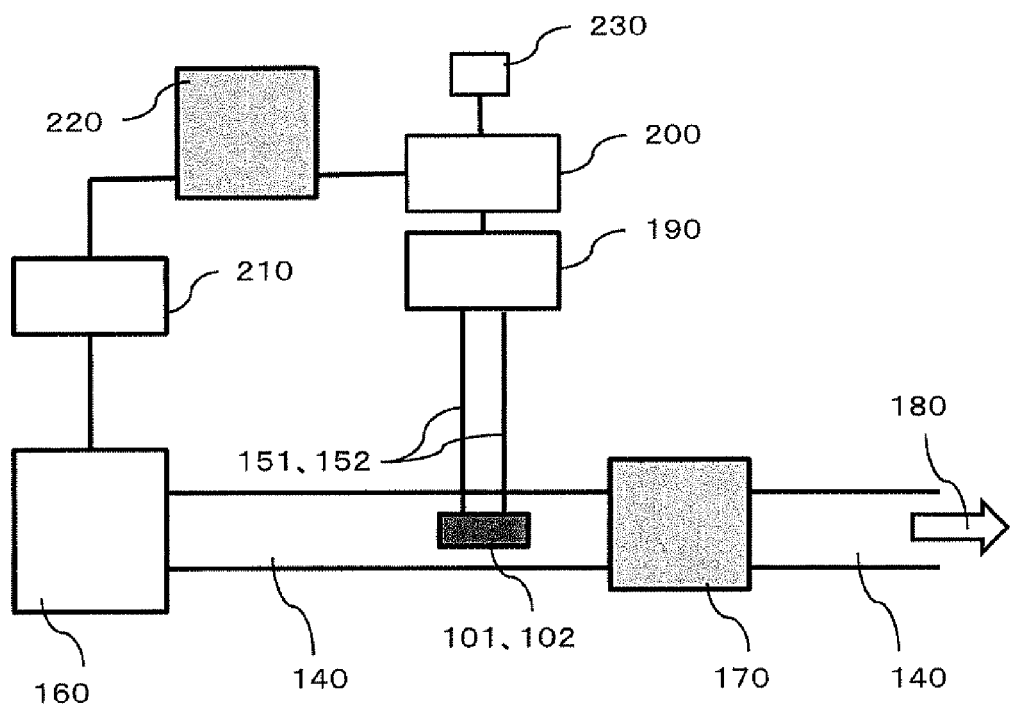
FIG. 2 is a schematic diagram showing an embodiment of a catalyst deterioration diagnosis apparatus used in the present invention.

The first embodiment of the present invention can be carried out by, for example, disposing a catalyst deterioration diagnosis element 101 shown in FIG. 1 at a certain position in an exhaust gas flow path 140 of a catalyst deterioration diagnosis apparatus shown in FIG. 2. Here, the catalyst deterioration diagnosis element 101 comprises a pair of electrodes 131 (first electrodes) and a test catalyst 121 disposed between the electrodes 131, and the catalyst deterioration diagnosis apparatus comprises resistance value measurement means 190 and determination means 200.

The catalyst deterioration diagnosis apparatus according to the first embodiment of the present invention comprises an exhaust gas purification catalyst 170 for purification of exhaust gas emitted from an internal combustion engine 160 in the exhaust gas flow path 140 through which the exhaust gas flows in a direction 180, as shown in FIG. 2. The catalyst deterioration diagnosis element 101 is disposed upstream of the exhaust gas purification catalyst 170 in the exhaust gas flow path 140. In addition, the positional relationship between the test catalyst 121 and the exhaust gas purification catalyst 170 according to the present invention is not limited to this positional relationship, and, for example, a structure may be employed in which the exhaust gas flow path 140 is branched upstream of the exhaust gas purification catalyst 170, and the catalyst deterioration diagnosis element 101 is disposed in a branch of the exhaust gas flow path 140.

The resistance value measurement means 190 only needs to be electrically connected to the test catalyst 121 through the electrodes 131, and to be capable of measuring over time the electrical resistance of the test catalyst 121 occurring when the electrodes 131 are energized. A resistance value measuring apparatus generally used as resistance value measurement means can 6 be used, as appropriate. Examples of such a resistance value measuring apparatus include a digital multimeter, and the like.

The test catalyst 121 in the catalyst deterioration diagnosis element 101 is preferably insulated by an insulating substrate 111 from any other electric conductors than the electrodes 131. The electrodes 131 are not particularly limited, and known electrodes can be employed, as appropriate. Examples of materials of such electrodes include Pt, W, Ni, Cr, Au, and the like. The distance between the pair of electrodes 131 is not particularly limited, and is preferably about 0.1 to 10 mm, from the viewpoint that a wide distance tends to result in an increased electrical resistance, whereas a narrow distance tends to result in conduction. In addition, the thickness of each electrode 131 is not particularly limited, and the cross-sectional area of the electrode 131 is preferably about 0.01 to 1 mm$^2$, from the viewpoint that a thin electrode tends to undergo breakage due to heat or tends to have a high electrical resistance, whereas a thick electrode tends to result in increase in costs.

The insulating substrate 111 only needs to be capable of isolating the test catalyst 121 from any other electric conductors, and is not particularly limited. Examples of materials of the insulating substrate 111 include alumina, silica, zirconia, and the like. The shape of the insulating substrate 111 is not particularly limited, and may be a plate-like shape, a spherical shape, or a shape having recesses and protrusions.

In addition, the catalyst deterioration diagnosis element 101 may further comprise mutually independent multiple test catalysts, and may further comprise electrodes disposed for the multiple test catalysts. Moreover, the catalyst deterioration diagnosis element 101 may further comprise a temperature sensor, an oxygen sensor, or the like, for further improving the precision of the measurement.

A method for producing the catalyst deterioration diagnosis element 101 is not particularly limited. For example, the catalyst deterioration diagnosis element 101 can be obtained as follows: first, the pair of electrodes 131 are vapor deposited on one surface of the insulating substrate 111 having a plate-like shape; subsequently, the test catalyst according to the present invention in a paste form obtained by adding a solvent such as ethylene glycol to the test catalyst in a powder form is applied onto the electrodes 131, so that the test catalyst and the electrodes 131 can be in contact with each other; and then this test catalyst in the paste form is calcined. An area on which the test catalyst is applied is not particularly limited, and is preferably about 0.1 to 1 cm$^2$. A thickness of the application is not particularly limited, and is preferably about 0.05 to 1 mm. Conditions of the calcination cannot be generalized because of dependence on the amount and kind of the test catalyst, the material of the insulating substrate, and the like, and are preferably 1 to 10 hours at 500 to 600° C., for example.

The electrodes 131 in the catalyst deterioration diagnosis element 101 are electrically connected to the resistance value measurement means 190 through pair wires 151. The resistance value measurement means 190 is further electrically connected to the determination means 200. Examples of the determination means 200 include a program installed in advance in a computer, and the like. Moreover, the determination means 200 is preferably further electrically connected to an OBD (On-board diagnostics) monitor 230, which serves as means for displaying the determination result, and the like.

The exhaust gas flow path 140 in which the catalyst deterioration diagnosis element 101 comprising the test catalyst 121 is thus disposed is not particularly limited, and examples thereof include a silica glass tube, an alumina tube, and the like. Moreover, the catalyst deterioration diagnosis apparatus used in the present invention comprises exhaust gas control means 210. The exhaust gas control means 210 may be, for example, means which is electrically connected to the internal combustion engine 160 located upstream of the exhaust gas flow path 140, and which is configured to invert the air-fuel ratio of the exhaust gas from a lean side to a rich side or from a rich side to a lean side by controlling oxygen or the like supplied to the internal combustion engine 160. Furthermore, the catalyst deterioration diagnosis apparatus used in the present invention preferably further comprises initial condition determination means (not illustrated) such as a program installed in advance in a computer.

In addition, in the catalyst deterioration diagnosis apparatus used in the present invention, each of the resistance value measurement means 190, the determination means 200, the exhaust gas control means 210, and the initial condition determination means is preferably electrically connected to an electronic control unit 220 which comprises a CPU, a ROM, a RAM, input/output ports, a storage device, and the like. Note that, in FIG. 2, the resistance value measurement means 190, the determination means 200, the exhaust gas control means 210, and the electronic control unit 220 are connected in series, but the configuration of electrical connection is not limited thereto in the catalyst deterioration diagnosis apparatus used in the present invention.

Moreover, if necessary, the catalyst deterioration diagnosis apparatus used in the present invention may further comprise control valves, various sensors, and the like each electrically connected to the resistance value measurement means 190, the determination means 200, the exhaust gas control means 210, the initial condition determination means, and the electronic control unit 220. Moreover, the catalyst deterioration diagnosis apparatus used in the present invention may further comprise an electric heater or the like for keeping the temperature constant.

In the catalyst deterioration diagnosis method of the first embodiment of the present invention, a first threshold based on which the determination is made is set. Specifically, first, multiple standard catalysts for quantification having known oxygen storage/release amounts are produced by performing durability tests (for example, heating in the air at temperatures of 500 to 1500° C. for 1 to 1000 hours) on the test catalyst 121, which is unused (non-deteriorated). Subsequently, these standard catalysts for quantification are each measured in advance for the resistance change ratio at oxidation or at reduction under the same conditions as those in the diagnosis, and the relationship between the oxygen storage/release performance and the resistance change ratio of the test catalyst 121 is found, and a resistance change ratio at a certain oxygen storage/release amount is set as the first threshold.

Figure 3:
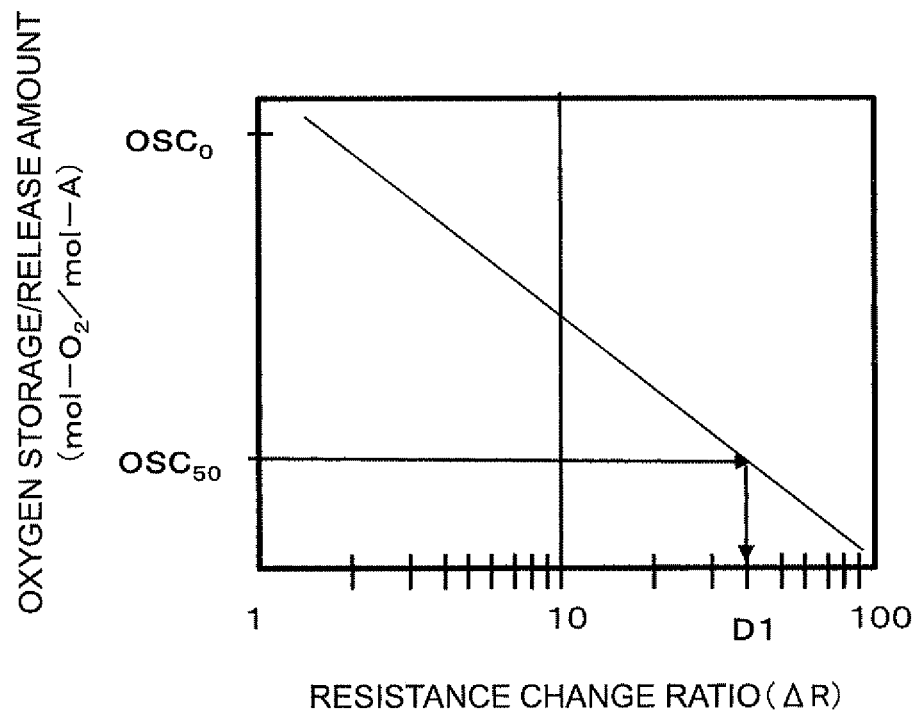
FIG. 3 is a graph showing an example of a relationship between an oxygen storage/release amount and a resistance change ratio.

For example, when a semi-log graph with the x-axis plotted on a logarithmic scale is created, where the x-axis represents the resistance change ratios ($\Delta R$) of the standard catalysts for quantification at reduction, and the y-axis represents the oxygen storage/release amounts ($\Delta O_2$) thereof, a linear relationship is obtained as shown in FIG. 3. Here, although the first threshold cannot be generalized because the first threshold varies depending on the kind of the test catalyst 121 to be diagnosed, the regulation value of the exhaust gas, and the like, D1 is set as the first threshold, when the catalyst is determined to be deteriorated at a point ($OSC_{50}$) where the oxygen storage/release amount becomes 50% or less of the oxygen storage/release amount ($OSC_0$) of the non-deteriorated catalyst, for example.

The method and conditions for measuring the resistance change ratios of such standard catalysts for quantification are preferably the same as those for the diagnosis of the deterioration of the catalyst, and specific examples thereof are the same as those described as the method and conditions for measuring the test catalyst described above. For example, when the resistance change ratio is measured at reduction, the resistance change ratio is measured preferably as follows. Specifically, first, while a nitrogen-oxygen mixture gas (lean gas) with an oxygen concentration of 0.1 to 10% by volume is being supplied to a standard catalyst for quantification disposed in the exhaust gas flow path, the temperature in the exhaust gas flow path is controlled and kept at 400 to 800° C. for 0.1 to 5 hours. Subsequently, with the temperature in the exhaust gas flow path being 400 to 800° C., the exhaust gas supplied is switched to a nitrogen-hydrogen mixture gas (rich gas) with a hydrogen concentration of 0.1 to 5% by volume. Then, a change over time in electrical resistance of the catalyst is measured for 10 to 60 seconds from the switching, and the resistance change ratio is found.

Note that, in the present invention, the oxygen storage/release amount refers to the storage/release amount (mol-$O_2$/mol-A) of oxygen per mole of the rare-earth element (A) in the catalyst at 500° C. The oxygen storage/release amount can be obtained from a reversible weight change measured as follows. Specifically, the catalyst is placed in a sample cell of a thermogravimetric analyzer (TG, manufactured by Shimadzu Corporation, trade name: TGA-5D). A gas composed of $H_2$ (20% by volume) and $N_2$ (80% by volume) and a gas composed of $O_2$ (25% by volume) and $N_2$ (75% by volume) are alternately passed for 10 minutes with switching every 10 minutes under a temperature condition of 500° C. at a flow rate of 100 ml/min to 15 mg of the catalyst, and the reversible weight change is measured by using the above-described thermogravimetric analyzer.

Figure 4:
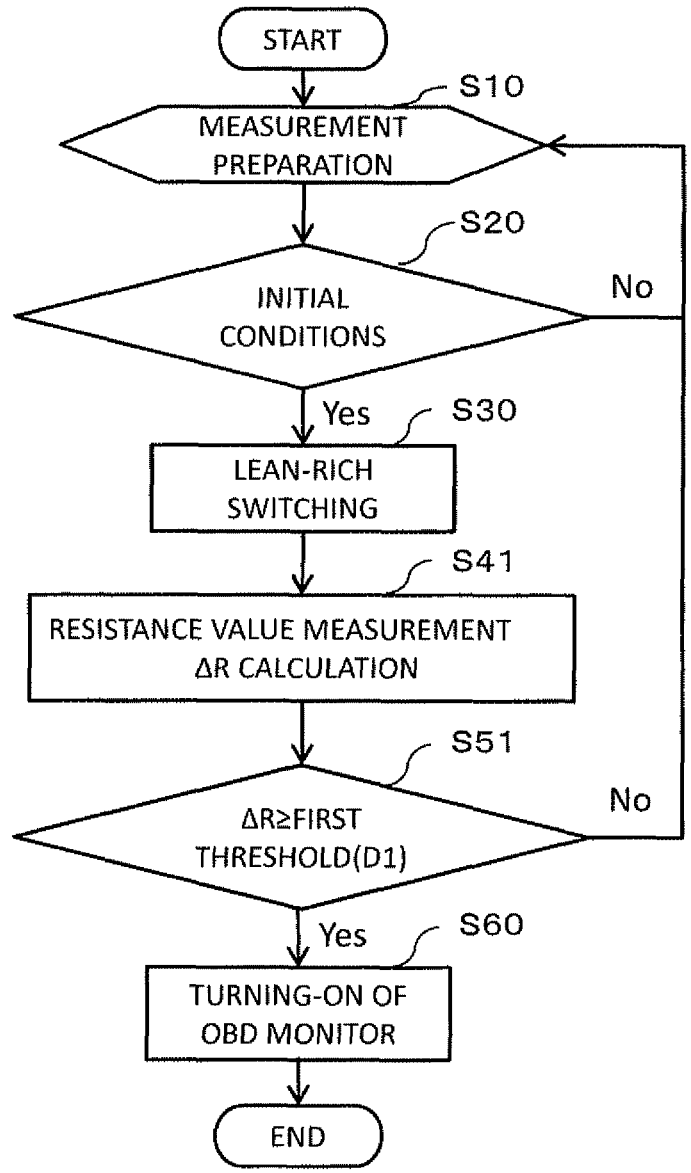
FIG. 4 is a flowchart showing a catalyst deterioration diagnosis method according to the first embodiment of the present invention.

As the catalyst deterioration diagnosis method in the first embodiment of the present invention, for example, a method according to a flowchart shown in FIG. 4 can be employed preferably. In the first embodiment of the present invention, after the start of the measurement, first, preparation is made for the measurement of the electrical resistance of the test catalyst 121 in a measurement preparation step of Step S10. Specifically, for example, when a resistance change ratio at reduction is employed at the setting of the first threshold, the air-fuel ratio of the exhaust gas is set to a lean side by causing the exhaust gas control means 210 to make lean the exhaust gas flowing in the exhaust gas flow path 140. In the first embodiment of the present invention, the oxidizing gas concentration in the lean gas is preferably within ±5% by volume from the oxidizing gas concentration employed at the setting of the first threshold. Note that also when the exhaust gas is made rich, the reducing gas concentration in the rich gas is preferably within ±5% by volume from the reducing gas concentration employed at the setting of the first threshold.

In addition, the temperature in the exhaust gas flow path 140 here is preferably within ±10° C. from the temperature employed at the setting of the first threshold. Moreover, in the present invention, such an air-fuel ratio condition of the exhaust gas and a temperature condition are preferably maintained for a certain period (preferably, 0.5 to 1 hour), before the process proceeds to the subsequent Step S20, from the viewpoint of further improving precision of the diagnosis by sufficiently performing the oxidation/reduction of the catalyst.

In an initial stage condition determination step of Step S20, the initial condition determination means is caused to determine whether or not the temperature in the exhaust gas flow path 140 and the composition of the exhaust gas fall within the conditions employed at the setting of the first threshold. If any one of the temperature and the composition is out of the ranges, the initial condition determination means determines that the process will return to the preceding Step S10 again. When the temperature and the composition fall within the ranges, the initial condition determination means determines that the process will proceed to the next Step S30. In the first embodiment of the present invention, since the resistance change ratio measured for the standard catalysts for quantification having known oxygen storage/release amounts is directly employed as the first threshold, the measurement of the resistance change ratio of the test catalyst 121 is preferably performed under the same conditions as those for the resistance change ratios of the standard catalysts for quantification, and it is preferable to determine whether or not at least the above-described temperature condition and exhaust gas condition are satisfied in such Step S20, before the measurement of the resistance change ratio, in order to further improve the precision of the diagnosis of the deterioration of the catalyst.

In the exhaust gas control step of Step S30, the temperature is adjusted, if necessary, and then the exhaust gas control means 210 is caused to invert the air-fuel ratio to a rich side when the air-fuel ratio in the exhaust gas flow path 140 is on a lean side, or to a lean side when the air-fuel ratio is on a rich side. Then, the process proceeds to Step S41. In a measurement step of Step S41, the resistance value measurement means 190 is caused to energize the electrodes 131, measure a change over time in electrical resistance of the test catalyst 121 under the same conditions as the conditions employed at the setting of the first threshold, and find an resistance change ratio (ΔR) thereof. Then, the process proceeds to Step S51.

Subsequently, in a determination step of Step S51, the determination means 200 is caused to compare the obtained resistance change ratio (ΔR) with the first threshold (D1), and determine whether or not the test catalyst 121 is deteriorated. For example, when a resistance change ratio at reduction is employed at the setting of the first threshold, the test catalyst 121 having a ΔR not smaller than D1 is determined to be deteriorated, whereas the test catalyst 121 having a ΔR smaller than D1 is determined to be not deteriorated.

When the test catalyst 121 is determined to be deteriorated in Step 351, for example, an indication that the catalyst is deteriorated is displayed by turning on the OBD monitor 230 or the like, and the catalyst deterioration diagnosis is terminated (Step S60). On the other hand, when the test catalyst 121 is determined not to be deteriorated in Step S51, the process returns to Step S10, and preparation is made again for the measurement of an electrical resistance of the test catalyst 121.

Note that when the process returned to Step S10 (the measurement preparation step) through Step S51 (the determination step), the preparation for the measurement of the electrical resistance is made preferably after the air-fuel ratio condition of the exhaust gas and the temperature condition after the measurement of the resistance change ratio are maintained for a certain period in Step S10 for sufficiently performing the oxidation/reduction of the catalyst. Specifically, a preferred example from the start of the measurement is as follow. First, in Step S10, the test catalyst 121 is sufficiently oxidized by adjusting the temperature, causing a lean gas to flow, and keeping these conditions for a certain period. Subsequently, after Step S20, the flowing exhaust gas is switched to a rich gas in Step S30. Then, the test catalyst 121 is reduced under a reducing atmosphere, and the resistance change ratio is measured in Step S40. Subsequently, when the process returns to Step S10 through Step S51, first, while the temperature in Steps S40 to S51 is being maintained, the test catalyst 121 is sufficiently reduced by causing the rich gas to flow for a certain period. After that, the test catalyst 121 is again sufficiently oxidized by adjusting the temperature, causing a lean gas to flow, and keeping these conditions for a certain period. Until the catalyst is determined to be deteriorated, Steps S20 to S51 are repeated.

Next, a second embodiment of the present invention will be described as another preferred mode of the present invention. The second embodiment of the present invention is the catalyst deterioration diagnosis method, wherein a catalyst deterioration diagnosis apparatus is used which comprises at least one pair of first electrodes which are disposed in the flow path and which face each other, the test catalyst disposed between the first electrodes, at least one pair of second electrodes which are disposed in the flow path and which face each other, a reference catalyst which is disposed between the second electrodes and which is subjected to a durability test in advance, resistance value measurement means electrically connected to the test catalyst and the reference catalyst, and determination means electrically connected to the resistance value measurement means, in the measurement step, the resistance change ratio of the test catalyst and a resistance change ratio of the reference catalyst are found by causing the resistance value measurement means to measure the change over time in electrical resistance of the test catalyst and a change over time in electrical resistance of the reference catalyst at the inversion of the air-fuel ratio, and in the determination step, the deterioration of the test catalyst is determined by causing the determination means to compare a ratio between the resistance change ratio of the test catalyst and the resistance change ratio of the reference catalyst with a second threshold regarding the ratio between the resistance change ratios set by finding in advance a relationship between an oxygen storage/release performance and the resistance change ratio of each of the test catalyst and the reference catalyst.

Figure 5:
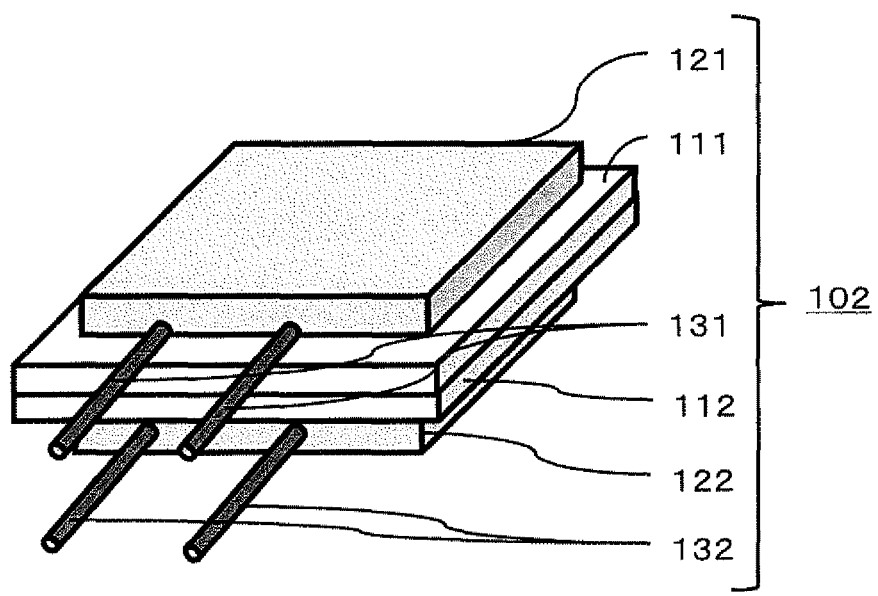
FIG. 5 is a schematic perspective view showing an embodiment of a catalyst deterioration diagnosis element according to a second embodiment of the present invention.

The second embodiment of the present invention can be carried out by, for example, disposing a catalyst deterioration diagnosis element 102 shown in FIG. 5 at a certain position in an exhaust gas flow path 140 of a catalyst deterioration diagnosis apparatus shown in FIG. 2. Here, the catalyst deterioration diagnosis element 102 comprises a pair of electrodes 131 (first electrodes), a test catalyst 121 disposed between the electrodes 131, a pair of electrodes 132 (second electrodes), and a reference catalyst 122 disposed between the electrode 132, and the catalyst deterioration diagnosis apparatus comprises resistance value measurement means 190 and determination means 200.

The resistance value measurement means 190 only need to be capable of energizing each of the pairs of the electrodes 131 and the electrodes 132, and determining over time an electrical resistance of each of the test catalyst 121 and the reference catalyst 122, and the same resistance value measurement means as that shown in the first embodiment of the present invention can be used.

Moreover, the catalyst deterioration diagnosis apparatus used in the second embodiment of the present invention is the same as the catalyst deterioration diagnosis apparatus used in the first embodiment of the present invention, except that the catalyst deterioration diagnosis element 102 is used instead of the catalyst deterioration diagnosis element 101, and the electrodes 131 and the electrodes 132 in the catalyst deterioration diagnosis element 102 are connected to the resistance value measurement means 190 and the like through respective wires 152.

In the catalyst deterioration diagnosis element 102, the test catalyst 121 and the reference catalyst 122 are preferably insulated by an insulating substrate 111 and an insulating substrate 112 from any other electric conductors than the electrodes 131 and the electrodes 132, respectively. The insulating substrate 111, the electrodes 131, and the test catalyst 121 are the same as described as above, and the insulating substrate 112 and the electrodes 132 are the same as the insulating substrate 111 and the electrodes 131.

The reference catalyst 122 is a catalyst obtained by subjecting the same catalyst as the test catalyst 121 to a durability test. The reference catalyst 122 is preferably such that, because of being subjected to the durability test in advance, the deterioration of the reference catalyst 122 does not proceed any further under the conditions for the diagnosis of the deterioration of the catalyst, and the oxygen storage/release performance is not lowered any further. In other words, the resistance change ratio at oxidation or at reduction is preferably substantially constant under the conditions for the diagnosis of the deterioration of the catalyst. The statement that "the resistance change ratio is substantially constant" in the present invention means that a difference between a maximum value and a minimum value of the resistance change ratios measured under the same conditions of the measurement temperature, the exhaust gas atmosphere, and electrode conditions are within 10%. Such a durability test is preferably, for example, a heat treatment performed in the air at 900 to 1500° C. for 5 to 20 hours, although the preferred durability test is not generalized because of dependence on the kind of the test catalyst to be diagnosed and conditions for the diagnosis of the deterioration of the catalyst.

In the catalyst deterioration diagnosis element 102, the insulating substrate 111 and the insulating substrate 112 may be the same, and the test catalyst 121 and the reference catalyst 122 may be on the same surface, or may be on opposite surfaces as shown in FIG. 5. In addition, the catalyst deterioration diagnosis element 102 may comprise mutually independent multiple test catalysts, reference catalysts, and respective electrodes. The catalyst deterioration diagnosis element 102 may further comprise a temperature sensor, an oxygen sensor, and the like, for further improving the precision of the measurement.

A method for producing the catalyst deterioration diagnosis element 102 is not particularly limited. For example, first, an element comprising the insulating substrate 111, the electrodes 131, and the test catalyst 121, and an element comprising the insulating substrate 112, the electrodes 132, and the reference catalyst 122 are fabricated in the same manner as described above, and then are attached onto each other. Thus, the catalyst deterioration diagnosis element 102 can be obtained. Moreover, in the second embodiment of the present invention, a structure may be employed in which the test catalyst 121 and the reference catalyst 122 are disposed away from each other.

In the catalyst deterioration diagnosis method in the second embodiment of the present invention, the second threshold based on which the determination is made is set. Specifically, first, in the same manner as in the first embodiment, a semilog graph is created in advance by using standard catalysts for quantification having known oxygen storage/release amounts, and a resistance change ratio ($\Delta Rx$) is set at which a certain oxygen storage/release amount is achieved. Subsequently, also for the reference catalyst 122, the resistance change ratio ($\Delta R_0$) at oxidation or at reduction is measured in advance under the same conditions as those for the standard catalysts for quantification, and the ratio ($\Delta R_0/\Delta R_x$) between these resistance change ratios is employed as the second threshold (D2).

Here, although the value of $\Delta R_x$ cannot be generalized because the value of $\Delta R_x$ varies depending on the kind of the test catalyst 121 to be diagnosed, the regulation value of the exhaust gas, and the like, D1 in FIG. 3 is set as $\Delta R_x$, when the catalyst is determined to be deteriorated at a point ($OSC_{50}$) where the oxygen storage/release amount become 50% of the oxygen storage/release amount ($OSC_0$) of the non-deteriorated catalyst, for example. The method and measurement conditions for measuring the resistance change ratios are the same as those described for the setting of the first threshold.

Figure 6:
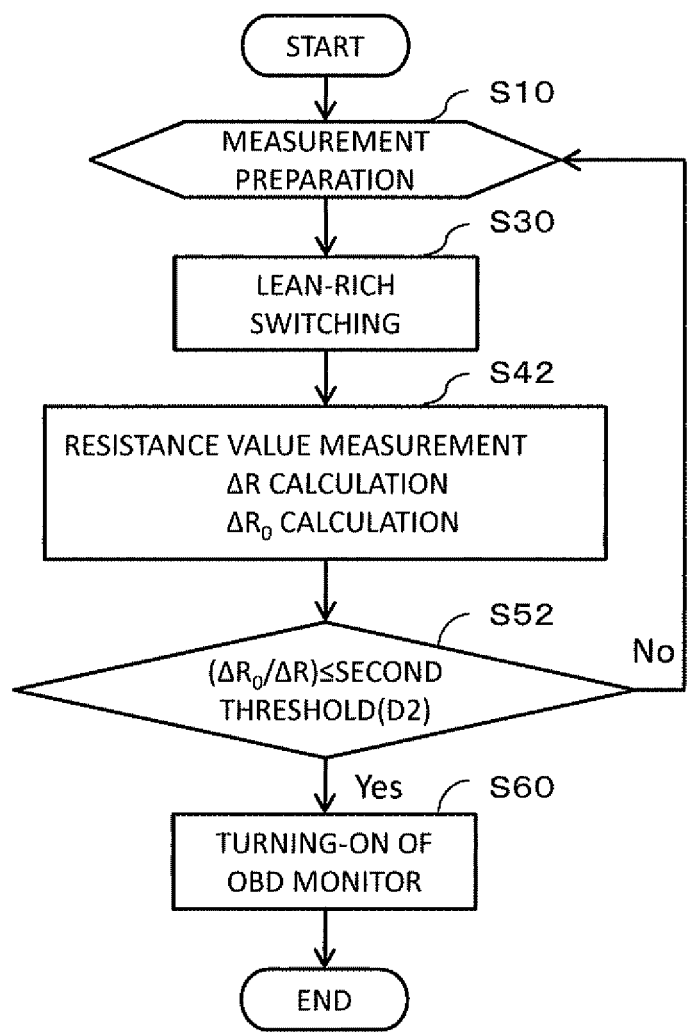
FIG. 6 is a flowchart showing a catalyst deterioration diagnosis method according to the second embodiment of the present invention.

As the catalyst deterioration diagnosis method in the second embodiment of the present invention, for example, a method according to a flowchart shown in FIG. 6 can be preferably employed. In the second embodiment of the present invention, first, after the start of the measurement, a preparation is made for the measurement of electrical resistances of the test catalyst 121 and the reference catalyst 122 in a measurement preparation step of Step S10. Such a measurement preparation step is the same as that described in the first embodiment.

Subsequently, it is preferable to perform an initial stage condition determination step of Step S20, in which the initial condition determination means is caused to determine whether or not the temperature in the exhaust gas flow path 140 and the composition of the exhaust gas fall within the conditions employed at the setting of the second threshold, in the same manner as in the first embodiment. However, in the second embodiment of the present invention, the Step S20 does not necessarily need to be performed because of the following reason. Specifically, since the resistance change ratio of the reference catalyst 122, whose resistance change ratio does not substantially change under the conditions for the diagnosis of the deterioration of the catalyst because of the sufficient deterioration, is simultaneously measured, a change in resistance change ratio due to measurement conditions can be corrected. Hence, regarding the measurement conditions, at least a condition that the air-fuel ratio is on a lean side or on a rich side needs to be satisfied.

Moreover, in the first embodiment of the present invention, when the test catalyst 121 is poisoned by an exhaust gas containing sulfur, phosphorus, or the like, there is a possibility that the resistance change ratio of the test catalyst 121 changes, so that the test catalyst 121 is determined to be deteriorated. However, in the second embodiment of the present invention, such a change in the resistance change ratio can also be corrected, and a wrong determination can be prevented, so that a catalyst deterioration diagnosis can be performed with a further high precision.

Subsequently, after an exhaust gas control step of Step S30 by the exhaust gas control means 210, the resistance change ratio ($\Delta R$) of the test catalyst 121 and the resistance change ratio ($\Delta R_0$) of the reference catalyst 122 are found by causing the resistance value measurement means 190 to energize the electrodes 131 and the electrodes 132, and to measure changes over time in electrical resistance of the test catalyst 121 and the reference catalyst 122 in a measurement step of Step S42. Then, the process proceeds to Step S52.

Subsequently, in a determination step of Step S52, the determination means 200 is caused to find a ratio ($\Delta R_0/\Delta R$) between the resistance change ratios $\Delta R$ and $\Delta R_0$, compare the obtained ratio between the resistance change ratios with the second threshold (D2), and determine whether or not the test catalyst 121 is deteriorated. For example, when a resistance change ratio at reduction is employed at the setting of the second threshold, the test catalyst 121 having a ratio between the resistance change ratios of D2 or less is determined to be deteriorated, whereas the test catalyst 121 having a ratio between the resistance change ratios exceeding D2 is determined not to be deteriorated.

When the test catalyst 121 is determined to be deteriorated in S52, the catalyst deterioration diagnosis is terminated after the subsequent Step S60. On the other hand, when the test catalyst 121 is determined not to be deteriorated in Step S52, the process returns to Step S10 (the measurement preparation step) again. Then, Step S30 (the exhaust gas control step), Step S42 (measurement step), and Step S52 (the determination step) are executed. These steps are repeated, until the test catalyst 121 is determined to be deteriorated in Step S52. Note that, also in the second embodiment of the present invention, when the process returned to Step S10 (the measurement preparation step) through Step S52 (the determination step), the preparation for the measurement of the measurement of the electrical resistance is started preferably after the air-fuel ratio condition of the exhaust gas and the temperature condition after the measurement of the resistance change ratio are maintained for a certain period in Step S10 for sufficiently performing the oxidation/reduction of the catalyst.

The use of such a catalyst deterioration diagnosis method makes it possible to diagnose deterioration of a catalyst for purification of exhaust gas emitted from an internal combustion engine in a simple and accurate manner. In the present invention, it is possible to use the catalyst for purification of exhaust gas, as it is, as the test catalyst, dispose the electrodes on the catalyst for purification of exhaust gas, and determine the deterioration based on the resistance change ratio. However, preferably, the catalyst deterioration diagnosis element 101 or the catalyst deterioration diagnosis element 102 in which the same catalyst as the exhaust gas purification catalyst 170 is used as the test catalyst 121 is disposed in the exhaust gas flow path 140 in which the exhaust gas purification catalyst 170 is also disposed, as shown in FIG. 2, and the above-described catalyst deterioration diagnosis method of the present invention is carried out. When the test catalyst 121 is determined to be deteriorated in such a catalyst deterioration diagnosis method, the exhaust gas purification catalyst 170 can also be determined to be deteriorated. Hence, the deterioration of the exhaust gas purification catalyst 170 can be diagnosed in a simple and accurate manner by monitoring the deterioration of the test catalyst 121. In addition, when electrical conductivity or electrical semi-conductivity cannot be secured in the exhaust gas purification catalyst 170, a major component of the exhaust gas purification catalyst 170 and/or part of the exhaust gas purification catalyst 170 which have an oxygen storage/release performance and have electrical conductivity or electrical semi-conductivity may be extracted, and used as the test catalyst 121. Preferred embodiments of the catalyst deterioration diagnosis method of the present invention are described above. However, the catalyst deterioration diagnosis method of the present invention is not limited to these embodiments. For example, in the catalyst deterioration diagnosis method of the present invention, various determination criteria other than those described above may be set.

Hereinabove, the catalyst deterioration diagnosis method of the present invention has been described. Now, hereinafter, a method for purification of exhaust gas, a catalyst deterioration diagnosis apparatus, and an apparatus for purification of exhaust gas of the present invention will be described.

Specifically, the method for purification of exhaust gas of the present invention is a method, wherein; the exhaust gas is brought into contact with the catalyst for purification of exhaust gas to purify the exhaust gas, and deterioration of the catalyst for purification of exhaust gas is diagnosed by using the above-described catalyst deterioration diagnosis method of the present invention.

In addition, the method for purification of exhaust gas of the present invention may further comprises an engine control step of keeping output power and fuel efficiency of an internal combustion engine emitting the exhaust gas higher, and performance of the catalyst for purification of exhaust gas higher through an electronic control unit (ECU) based on a signal detected by a sensor for monitoring the exhaust gas, the catalyst for purification of exhaust gas, and the test catalyst.

Moreover, the catalyst deterioration diagnosis apparatus of the present invention is an apparatus for diagnosing deterioration of a catalyst for purification of exhaust gas, comprising:

a test catalyst disposed in an exhaust gas flow path through which the exhaust gas flows;

means for inverting an air-fuel ratio of the exhaust gas in the flow path from a lean side to a rich side or from a rich side to a lean side;

means for measuring a change over time in electrical resistance of the test catalyst at the inversion of the air-fuel ratio and finding a resistance change ratio of the test catalyst; and means for determining deterioration of the test catalyst based on the resistance change ratio.

In addition, the apparatus for purification of exhaust gas of the present invention comprises the catalyst for purification of exhaust gas disposed in the exhaust gas flow path through which the exhaust gas flows, and the catalyst deterioration diagnosis apparatus of the present invention for diagnosing deterioration of the catalyst for purification of exhaust gas.

In addition, the apparatus for purification of exhaust gas of the present invention may further comprises: an internal combustion engine of emitting the exhaust gas and changing composition of the exhaust gas; a sensor for monitoring the exhaust gas, the catalyst for purification of exhaust gas, and the test catalyst; the electronic control unit (ECU) of keeping output power and fuel efficiency of the internal combustion engine higher, and performance of the catalyst for purification of exhaust gas higher based on the signal detected by the sensor. Examples of sensors include thermometers, A/F sensors, and the like.

In this manner, the method for purification of exhaust gas of the present invention, the catalyst deterioration diagnosis apparatus of the present invention, and the apparatus for purification of exhaust gas use the catalyst deterioration diagnosis method of the present invention. Accordingly, the method for purification of exhaust gas and the apparatus for purification of exhaust gas can purify the exhaust gas emitted from the combustion engine with guarantee the emission within restrictions on exhaust gas.

EXAMPLES

Hereinafter, the present invention will be described more specifically based on Examples. However, the present invention is not limited to Examples below. Note that the oxygen storage/release amount of the catalyst in each Catalyst Preparation Example was measured as follows.

<Measurement of Oxygen Storage/Release Amount>

A catalyst obtained in each Catalyst Preparation Example was placed in a sample cell of a thermogravimetric analyzer (TG, manufactured by Shimadzu Corporation, trade name: TGA-5D), and a gas composed of $H_2$ (20% by volume) and $N_2$ (80% by volume) and a gas composed of $O_2$ (25% by volume) and $N_2$ (75% by volume) were alternately passed for 10 minutes with switching every 10 minutes at a flow rate of 100 ml/min to 15 mg of the catalyst under a temperature condition of 500° C. From a reversible weight change, an oxygen storage/release amount ($\Delta O_2$, mol-$O_2$/mol-Ce) per mole of cerium at 500° C. was calculated by using the above described thermogravimetric analyzer.

Catalyst Synthesis Example 1

In accordance with the method described in Japanese Unexamined Patent Application Publication No. 2009-84061, a catalyst was prepared as follows. Specifically, first, a mixture liquid was prepared by dissolving 49.1 g of an aqueous cerium nitrate solution with a concentration of 28% by mass in terms of $CeO_2$, 54.7 g of an aqueous zirconium oxynitrate solution with a concentration of 18% by mass in terms of $ZrO_2$, and 1.2 g of a nonionic surfactant (manufactured by Lion Corporation, trade name: LEOCON) in 90 cc of ion-exchanged water, and coprecipitation was performed by adding, to this mixture liquid, ammonia water containing $NH_3$ at 25% by mass, so that the amount of $NH_3$ was 1.2 equivalents to the anions in the mixture liquid. Subsequently, the obtained coprecipitates were filtered, washed, dried at 110° C. Then, the coprecipitates were placed in a furnace, and calcined in the air at 1000° C. for 5 hours. Thus, a ceria-zirconia solid solution was obtained. Subsequently, the solid solution was pulverized by using a pulverizer (manufactured by AS ONE Corporation, trade name: Wonder Blender) to an average particle diameter of 1000 nm. Thus, a powder of the ceria-zirconia solid solution was obtained which had a molar ratio ($CeO_2$:$ZrO_2$) of the contained ceria and zirconia of 50:50.

Subsequently, 50 g of the obtained powder of the ceria-zirconia solid solution was packed in a polyethylene bag (capacity: 0.05 L). The inside of the bag was degassed, and then the opening of the bag was sealed by heating. Next, the bag was subjected to a hydrostatic pressure pressing (CIP: cold isostatic pressing) at a pressure of 300 MPa for 1 minute by using a hydrostatic pressure pressing machine (manufactured by NIKKISO CO., LTD., trade name: CK-4-22-60) for molding. Thus, a solid raw material made of the powder of the ceria-zirconia solid solution was obtained. Note that this operation was performed multiple times, so that 10 solid raw materials were molded.

Subsequently, each of the 10 solid raw materials taken out from the bags after the pressing was packed into a graphite cylindrical container (internal volume: 15 cm in diameter and 20 cm in height), and a graphite lid was placed on the container. Subsequently, the cylindrical container was disposed in a furnace (graphite furnace) whose inside was made of a graphite heat insulator and heat generator. After that, the furnace was evacuated with a diffusion pump to 0.01 Torr, and then argon gas was introduced into the furnace to obtain an atmosphere of 100% by volume argon gas. Next, the temperature in the furnace was set to 1700° C., and the solid sample was heated for 5 hours to perform a reduction treatment thereon. Thus, a composite oxide precursor was obtained. After that, the furnace was cooled until the temperature in the furnace reached 50° C., and the composite oxide precursor was taken out from the furnace. Then, the obtained composite oxide precursor was oxidized by heating in the air under a temperature condition of 500° C. for 5 hours. Thus, a ceria-zirconia composite oxide was obtained. Note that the obtained ceria-zirconia composite oxide was pulverized in a mortar, so that a powder having an average particle diameter of 5 μm was obtained.

Catalyst Preparation Example 1

First, 2 parts by mass of the powder of the ceria-zirconia composite oxide obtained in Catalyst Synthesis Example 1 and 1 part by mass of ethylene glycol (manufactured by Tokyo Chemical Industry Co., Ltd., trade name: Polyethylene Glycol #300) were mixed with each other in a mortar to obtain a uniform paste. Subsequently, a substrate was fabricated by vapor-depositing two Pt wires having thicknesses of 2 mm on an alumina plate of 1 cm square, with the distance between the electrodes being 5.0 mm. The thickness of each of the Pt wires was approximately 200 nm. The paste was applied in a thickness of 0.1 mm onto the substrate, so that the Pt wires were covered with the paste. The paste was calcined in the air at 500° C. for 5 hours. Thus, a catalyst deterioration diagnosis element 1 was obtained. The oxygen storage/release amount of the catalyst (catalyst 1) in the catalyst deterioration diagnosis element 1 was 0.25 (mol-$O_2$/mol-Ce).

Catalyst Preparation Example 2

A catalyst deterioration diagnosis element obtained in the same manner as in Catalyst Preparation Example 1 was subjected to a durability test of heating in the air under a temperature condition of 1100° C. for 5 hours. The catalyst deterioration diagnosis element after the durability test was termed as a catalyst deterioration diagnosis element 2. The oxygen storage/release amount of the catalyst (catalyst 2) in the catalyst deterioration diagnosis element 2 was 0.22 (mol-$O_2$/mol-Ce).

Catalyst Preparation Example 3

A catalyst deterioration diagnosis element 3 was obtained in the same manner as in Catalyst Preparation Example 2, except that the temperature condition of the durability test was 1400° C. The oxygen storage/release amount of the catalyst (catalyst 3) in the catalyst deterioration diagnosis element 3 was 0.16 (mol-$O_2$/mol-Ce).

Catalyst Preparation Example 4

A catalyst deterioration diagnosis element 4 was obtained in the same manner as in Catalyst Preparation Example 2, except that the temperature condition of the durability test was 1500° C. The oxygen storage/release amount of the catalyst (catalyst 4) in the catalyst deterioration diagnosis element 4 was 0.10 (mol-$O_2$/mol-Ce)

Example 1

Figure 7:
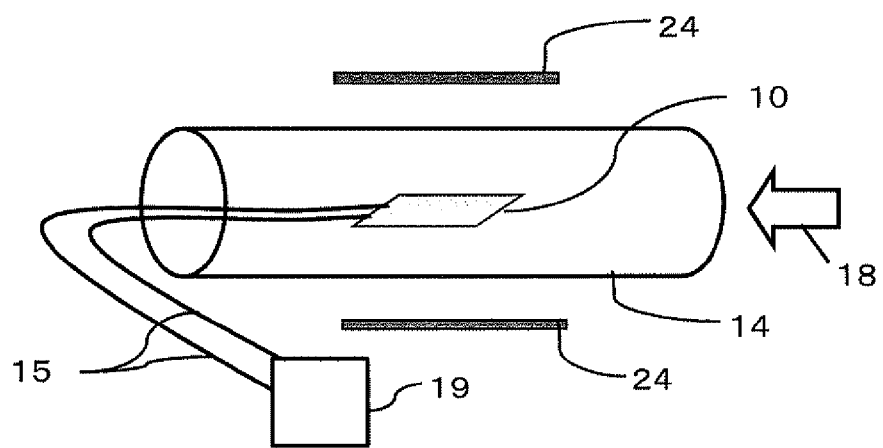
FIG. 7 is a schematic diagram showing a measuring apparatus used in Examples 1 and 2.

First, by using an apparatus shown in FIG. 7, the catalyst deterioration diagnosis element 1 (a catalyst deterioration diagnosis element 10) in which Pt wires 15 having diameters of 0.2-mm were connected to the Pt electrodes was disposed in a silica glass tube 14 having an inner diameter of ¼ inches. In the apparatus shown in FIG. 7, a heater 24 provided with a temperature controlling device was attached to the silica glass tube 14, and a resistance value measuring apparatus 19 (manufactured by HP, trade name: Multimeter 34401A) configured to energize the Pt electrodes and measure the electrical resistance of the catalyst 1 was connected to the Pt wires 15. The inside of the silica glass tube 14 was heated to 600° C. at a rate of temperature rise of 100° C./10 min, while a gas (lean gas) composed of $O_2$ (1% by volume) and $N_2$ (99% by volume) was supplied into the silica glass tube 14 in a direction 18 at a flow rate of 300 cc/min. Thus, an oxidizing atmosphere was created in the silica glass tube 14, and the atmosphere was kept as it was for 1 hour. After that, the supplied gas was switched to a gas (rich gas) composed of $H_2$ (1% by volume) and $N_2$ (99% by volume) to create a reducing atmosphere in the silica glass tube 14. The electrical resistance of the catalyst 1 was measured for 10 seconds from the switching of the gas, and the resistance change ratio (ΔR) at reduction was found by the following formula:

$$\Delta R = [\text{Electrical Resistance } (\Omega) \text{ at Switching of Gas}] / [\text{Electrical Resistance } (\Omega) \text{ 10 Seconds after Switching of Gas}].$$

Figure 8:
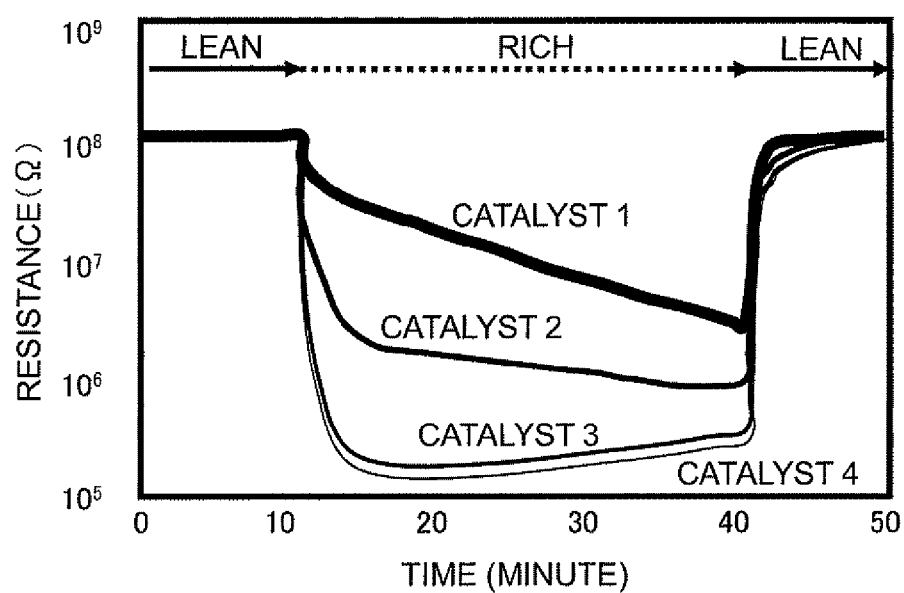
FIG. 8 is a graph showing change over time in electrical resistance associated with switching of gas in Example 1.
Figure 9:
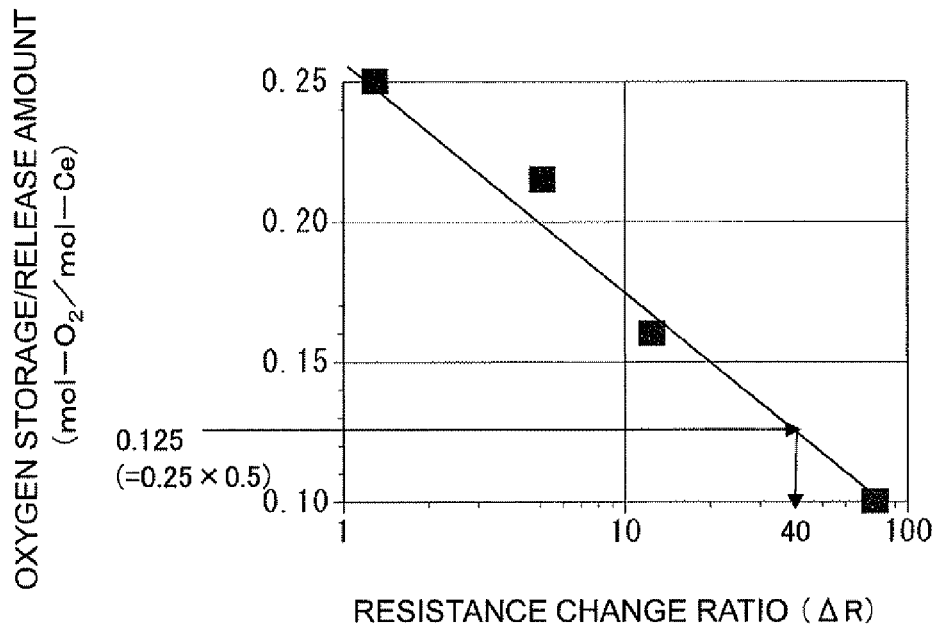
FIG. 9 is a graph showing relationships between an oxygen storage/release amount and a resistance change ratio in Example 1.

Subsequently, the resistance change ratio at reduction was found for the catalyst deterioration diagnosis elements 2 to 4 in the same manner. FIG. 8 shows a graph showing a change over time in electrical resistance of each catalyst associated with the switching of the gas. Table 1 shows the oxygen storage/release amount and the resistance change ratio at reduction of each catalyst. Moreover, FIG. 9 shows a semi-log graph with the x-axis being plotted on a logarithmic scale, where the x-axis represents the resistance change ratio at reduction of each catalyst, and the y-axis represents the oxygen storage/release performance thereof.

TABLE 1

| Catalyst | Durability test | Oxygen storage/release amount (mol-$O_2$/mol-Ce) | Resistance change ratio ($\Delta R$) |
|---|---|---|---|
| Catalyst 1 | None | 0.25 | 1.3 |
| Catalyst 2 | 1100° C. × 5 hours | 0.22 | 5.1 |
| Catalyst 3 | 1400° C. × 5 hours | 0.16 | 12.5 |
| Catalyst 4 | 1500° C. × 5 hours | 0.1 | 76.9 |

As is apparent from the results shown in FIG. 8, it was shown that the electrical resistance of each catalyst greatly changed, when the air-fuel ratio was inverted from the lean side (oxidizing atmosphere) to the rich side (reducing atmosphere), and that the change ratio increased with the increase in degree of the deterioration of the catalyst. Moreover, as is apparent from the results shown in FIG. 9, it was shown that a linear relationship was obtained between the logarithm of the resistance change ratio and the oxygen storage/release amount. This indicates that deterioration of a test catalyst can be accurately determined by measuring and monitoring the resistance change ratio of the test catalyst. For example, when a catalyst whose oxygen storage/release performance is 50% or less of the non-deteriorated catalyst (catalyst 1) is determined to be deteriorated, the threshold is set to 40 based on FIG. 9. Then, when the resistance change ratio is 40 or higher, the catalyst can be determined to be "deteriorated."

Example 2

The catalyst 1 was used as the test catalyst, and the catalyst 4 was used as the reference catalyst. First, in order to make a determination that a catalyst was deteriorated, when the oxygen storage/release performance of the catalyst was 50% or less of that of the non-deteriorated catalyst (catalyst 1), a threshold (D2) was set by using the results of the Example 1 based on the following formula:

D2=[76.9(Resistance Change Ratio of Catalyst 4)]/[40 (Resistance Change Ratio at Oxygen Storage/Release Amount being 50% of that of Catalyst 1)], i.e., D2=2.

Subsequently, in the same manner as in the second embodiment of the present invention shown in FIG. 5, a surface of the alumina plate in the catalyst deterioration diagnosis element 4 on which the catalyst 4 was not applied was attached onto a surface of the alumina plate in the catalyst deterioration diagnosis element 1 on which the catalyst 1 was not applied. Thus, a catalyst deterioration diagnosis element 5 was fabricated in which the catalyst 1 was used as the test catalyst, and the catalyst 4 was used as the reference catalyst. Subsequently, by using the same apparatus as that used in Example 1, except that an alumina tube having an inner diameter of ¼ inches was used instead of the silica glass tube 14, and that a catalyst deterioration diagnosis element 5 in which the Pt electrodes were connected to respective Pt wires having diameters of 0.2 mm was used instead of the catalyst deterioration diagnosis element 1, the inside of the alumina tube was heated to 1400° C. at a rate of temperature rise of 100° C./10 min, while a gas (lean gas) composed of $O_2$ (1% by volume) and $N_2$ (99% by volume) was supplied into the alumina tube at a flow rate of 300 cc/min. The inside of the alumina tube was kept at 1400° C. for 1 hour under the oxidizing atmosphere. After that, the inside of the alumina tube was cooled to around 600° C. at a rate of temperature drop of 200° C./10 min, and then the supplied gas was switched to a gas (rich gas) composed of $H_2$ (1% by volume) and $N_2$ (99% by volume), so that a reducing atmosphere was created in the alumina tube. The electrical resistances of the catalyst 1 and the catalyst 4 were measured for 10 seconds from the switching of the gas, and the resistance change ratio ($\Delta R$) of the catalyst 1 and the resistance change ratio ($\Delta R_0$) of the catalyst 4 were found. Then, the ratio ($\Delta R_0/\Delta R$) between these resistance change ratios was found (first durability test).

After the ratio between the resistance change ratios was found in the first durability test, and 30 minutes after the switching of the gas, the inside of the alumina tube was heated to 1400° C. at a rate of temperature rise of 100° C./10 min, while the lean gas was again being supplied. The inside of the alumina tube was kept at 1400° C. for 1 hour, and then was cooled to around 600° C. at a rate of temperature drop of 200° C./10 min. Then, the supplied gas was switched to the rich gas. The electrical resistances of the catalyst 1 and the catalyst 4 were measured for 10 seconds from the switching of the gas, and the ratio ($\Delta R_0/\Delta R$) between the resistance change ratios in the second durability test was found in the same manner as described above. Similarly, the ratios between the resistance change ratios were found in the third to tenth durability tests, and the catalyst 1 was determined to be deteriorated in the seventh durability test, where the ratio between the resistance change ratios became not higher than the threshold (D2: 2).

Figure 10:
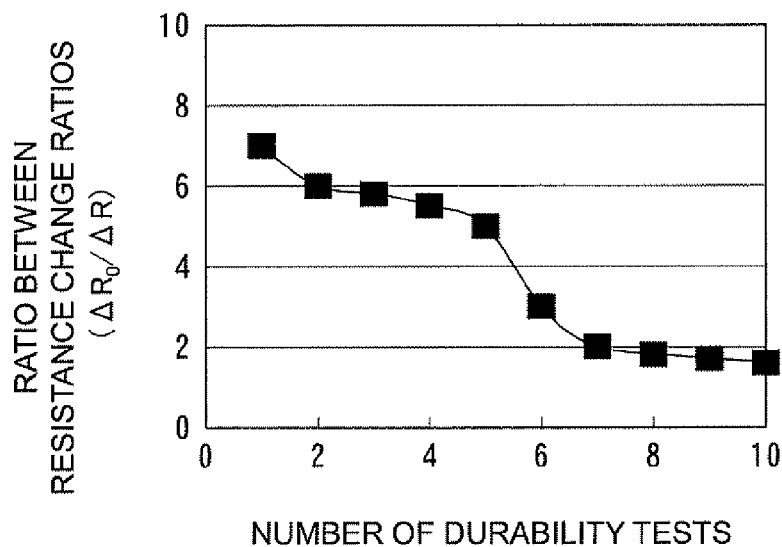
FIG. 10 is a graph showing a relationship between the number of durability tests and a ratio between resistance change ratios in Example 2.

FIG. 10 shows the relationship between the number of the durability tests and the ratio between the resistance change ratios. This demonstrated that, in Example 2, the resistance change ratio was hardly lowered, and the catalyst 1 was not deteriorated any further after the seventh durability test, at which the catalyst 1 was determined to be deteriorated. In other words, it was shown that the catalyst 1 was deteriorated in the seventh durability test, in agreement with the determination result in Example 2.

As described above, the present invention makes it possible to diagnose deterioration of a catalyst based on information directly obtained from a test catalyst in a simple and accurate manner. Hence, the catalyst deterioration diagnosis method of the present invention is particularly useful as a method for diagnosing deterioration of a catalyst for purification of exhaust gas having an oxygen storage/release performance.

What is claimed is:

1. A catalyst deterioration diagnosis apparatus for diagnosing deterioration of a catalyst for purification of exhaust gas, comprising:
a test catalyst disposed in an exhaust gas flow path through which the exhaust gas flows; and
an electronic control unit configured to:
invert an air-fuel ratio of the exhaust gas in the flow path from a lean side to a rich side or from a rich side to a lean side;
measure a change over time in electrical resistance of the test catalyst at the inversion of the air-fuel ratio and find a resistance change ratio of the test catalyst; and
determine deterioration of the test catalyst based on the resistance change ratio.

2. An apparatus for purification of exhaust gas, comprising:
a catalyst for purification of exhaust gas disposed in an exhaust gas flow path through which the exhaust gas flows; and
a catalyst deterioration diagnosis apparatus for diagnosing deterioration of the catalyst for purification of exhaust gas, the catalyst deterioration diagnosis apparatus comprising:
a test catalyst disposed in the exhaust gas flow path through which the exhaust gas flows; and
an electronic control unit configured to:

invert an air-fuel ratio of the exhaust gas in the flow path from a lean side to a rich side or from a rich side to a lean side;

measure a change over time in electrical resistance of the test catalyst at the inversion of the air-fuel ratio and find a resistance change ratio of the test catalyst; and determine deterioration of the test catalyst based on the resistance change ratio.

3. A catalyst deterioration diagnosis method for diagnosing deterioration of a catalyst for purification of exhaust gas by using a test catalyst disposed in an exhaust gas flow path through which the exhaust gas flows, the method comprising:

a flowing step of flowing the exhaust gas into contact with the test catalyst;

an exhaust gas control step of inverting an air-fuel ratio of the exhaust gas in the flow path from a lean side to a rich side or from a rich side to a lean side;

a measurement step of measuring a change over time in electrical resistance of the test catalyst at the inversion of the air-fuel ratio and finding a resistance change ratio of the test catalyst; and a determination step of determining deterioration of the test catalyst based on the resistance change ratio.

4. The catalyst deterioration diagnosis method according to claim 3, wherein each of the test catalyst and the catalyst for purification of exhaust gas to be diagnosed is a catalyst comprising a rare-earth metal oxide.

5. The catalyst deterioration diagnosis method according to claim 3, wherein a measurement temperature in the measurement step is 400 to 1200° C.

6. The catalyst deterioration diagnosis method according to claim 3, wherein the measurement step is a step of finding the resistance change ratio at the inversion of the air-fuel ratio from a lean side to a rich side.

7. The catalyst deterioration diagnosis method according to claim 3, wherein, a catalyst deterioration diagnosis apparatus is used which comprises:

at least one pair of first electrodes which are disposed in the flow path and which face each other, the test catalyst disposed between the first electrodes, and an electronic control unit electrically connected to the test catalyst, in the measurement step, the resistance change ratio of the test catalyst is found by causing the electronic control unit to measure the change over time in electrical resistance of the test catalyst at the inversion of the air-fuel ratio, and in the determination step, the deterioration of the test catalyst is determined by causing the electronic control unit to compare the resistance change ratio with a first threshold regarding the resistance change ratio set by finding in advance a relationship between an oxygen storage/release performance and the resistance change ratio of the test catalyst.

8. The catalyst deterioration diagnosis method according to claim 3, wherein, a catalyst deterioration diagnosis apparatus is used which comprises:

at least one pair of first electrodes which are disposed in the flow path and which face each other, the test catalyst disposed between the first electrodes, at least one pair of second electrodes which are disposed in the flow path and which face each other, a reference catalyst which is disposed between the second electrodes and which is subjected to a durability test in advance, and an electronic control unit electrically connected to the test catalyst and the reference catalyst, in the measurement step, the resistance change ratio of the test catalyst and a resistance change ratio of the reference catalyst are found by causing the electronic control unit to measure the change over time in electrical resistance of the test catalyst and a change over time in electrical resistance of the reference catalyst at the inversion of the air-fuel ratio, and in the determination step, the deterioration of the test catalyst is determined by causing the electronic control unit to compare a ratio between the resistance change ratio of the test catalyst and the resistance change ratio of the reference catalyst with a second threshold regarding the ratio between the resistance change ratios set by finding in advance a relationship between an oxygen storage/release performance and the resistance change ratio of each of the test catalyst and the reference catalyst.

9. A method for purification of exhaust gas, wherein, the exhaust gas is brought into contact with the catalyst for purification of exhaust gas to purify the exhaust gas, and deterioration of the catalyst for purification of exhaust gas is diagnosed by using the catalyst deterioration diagnosis method according to claim 3.

* * * * *